April 2, 1968     D. C. IVES ET AL     3,375,711
ENGINE PERFORMANCE INDICATOR AND COLLECTOR
Filed May 13, 1965     7 Sheets-Sheet 1
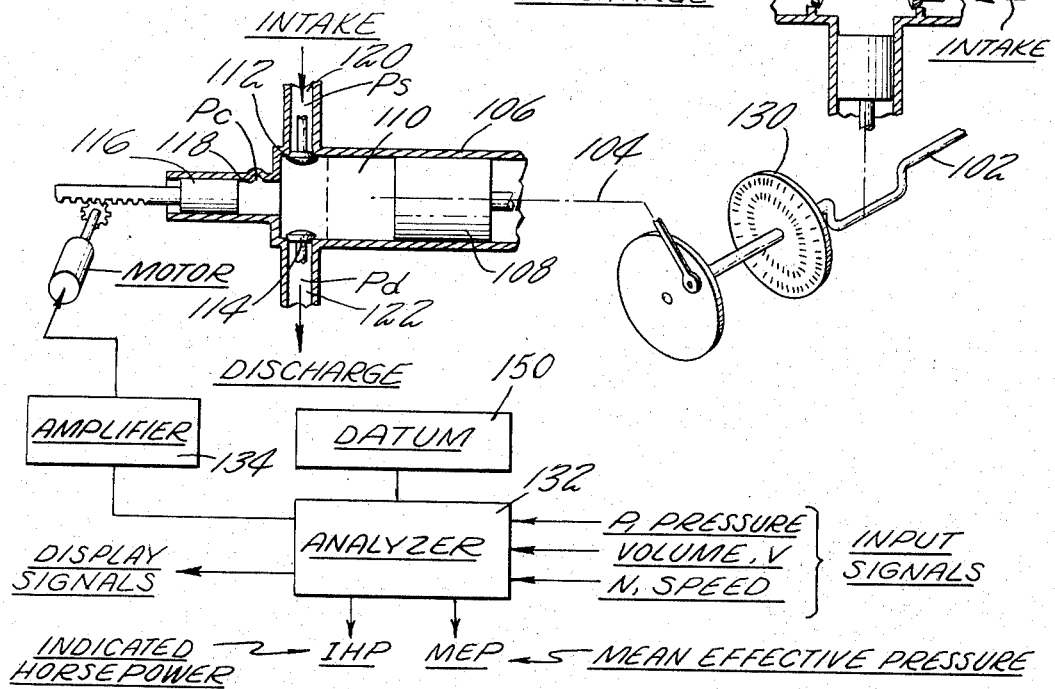
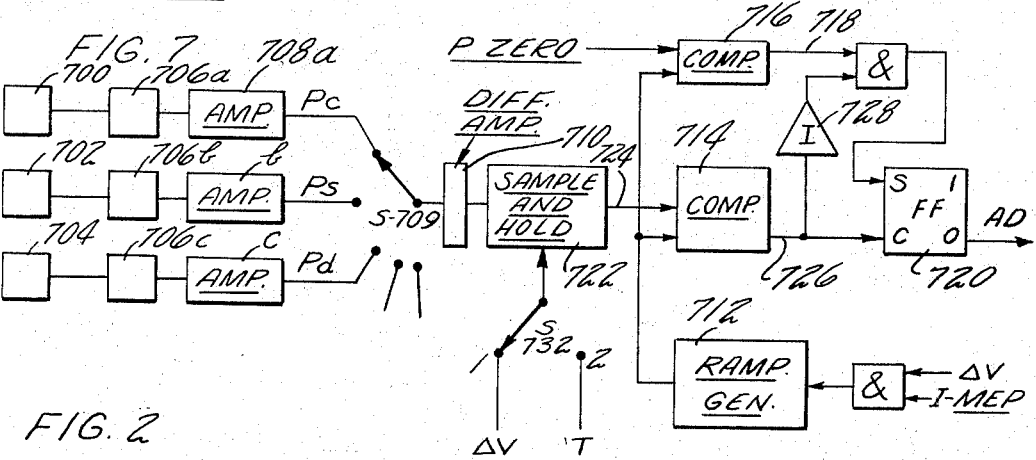
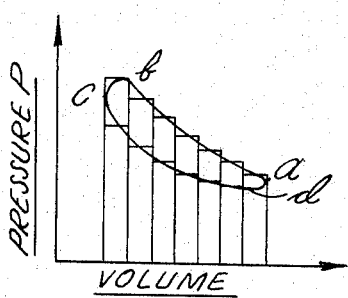
INVENTORS
DAVID C. IVES
JOHN LOVKAY
BY Donald J. Bradley
ATTORNEY INVENTORS
DAVID C. IVES
JOHN LOVKAY
BY Donald J. Bradley
ATTORNEY

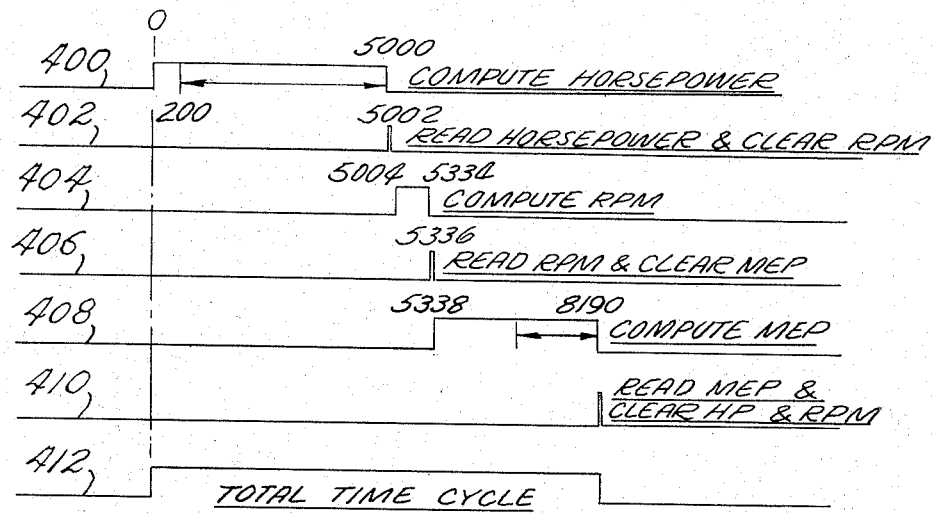
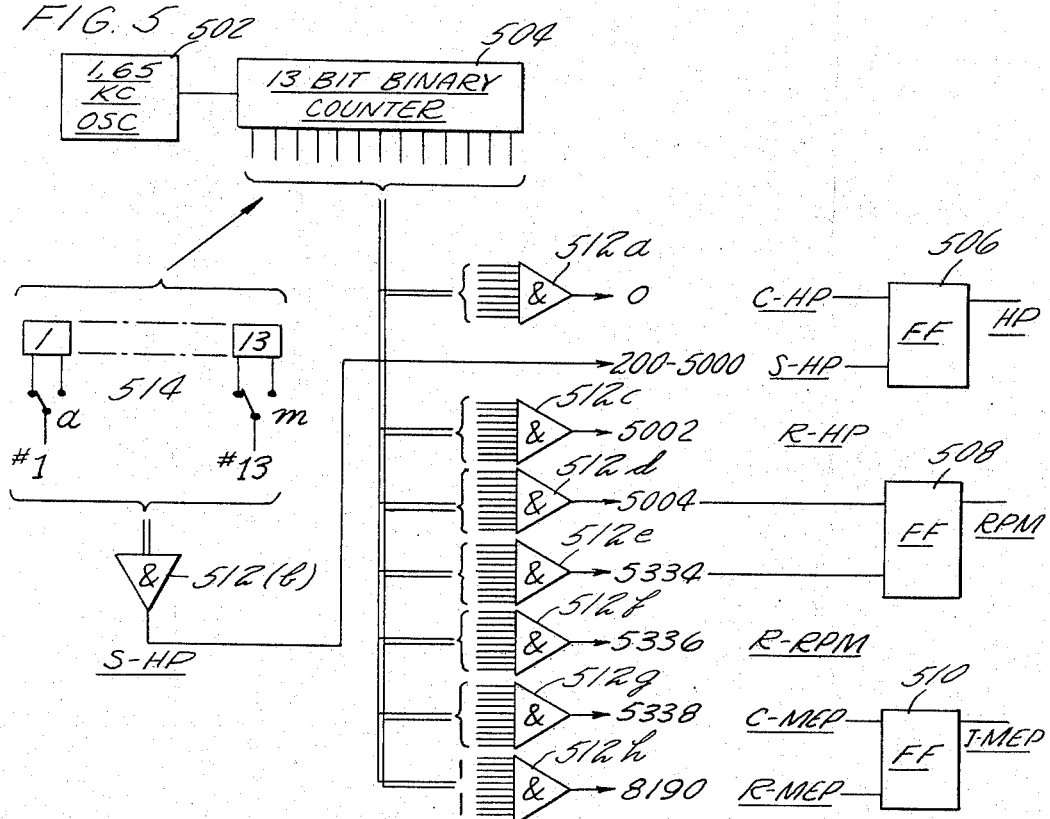

April 2, 1968 D. C. IVES ET AL 3,375,711
ENGINE PERFORMANCE INDICATOR AND COLLECTOR
Filed May 13, 1965 7 Sheets-Sheet 4
FIG. 6
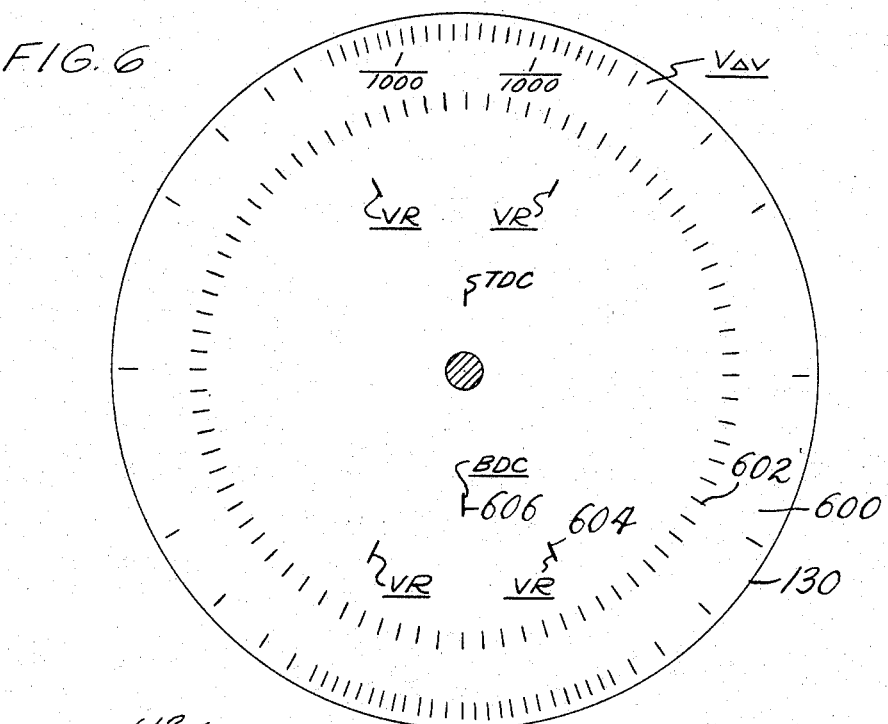
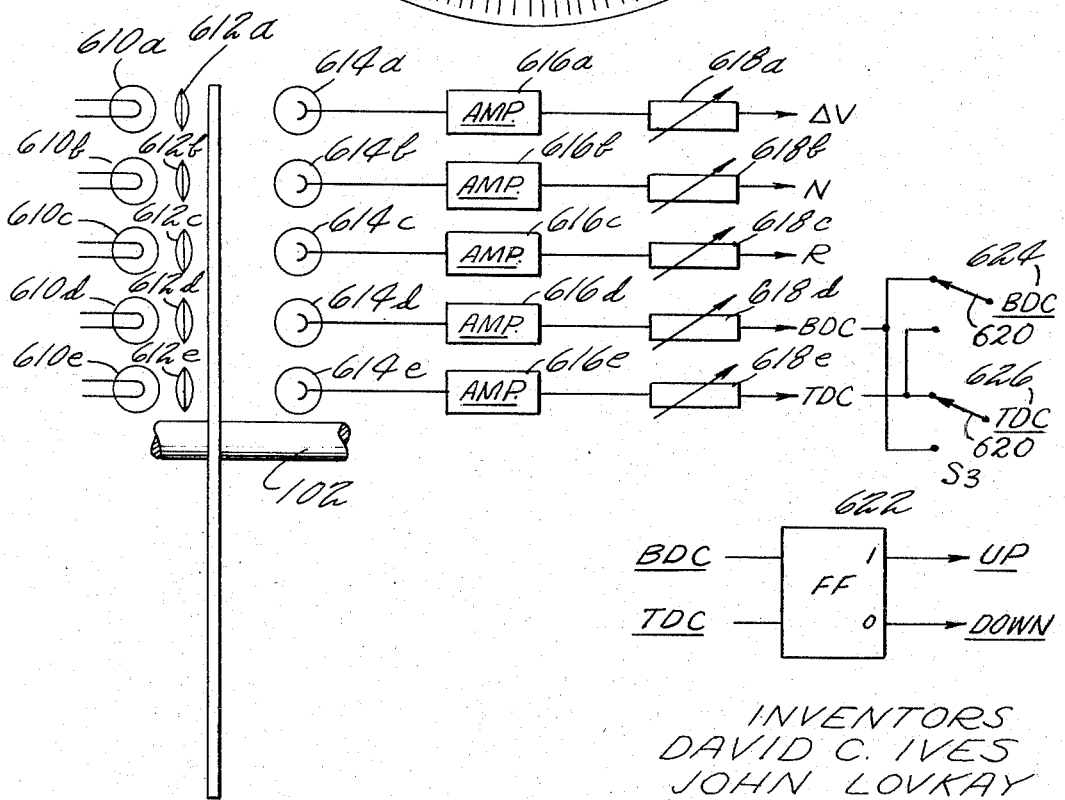
INVENTORS
DAVID C. IVES
JOHN LOVKAY
BY Donald J. Bradley
ATTORNEY

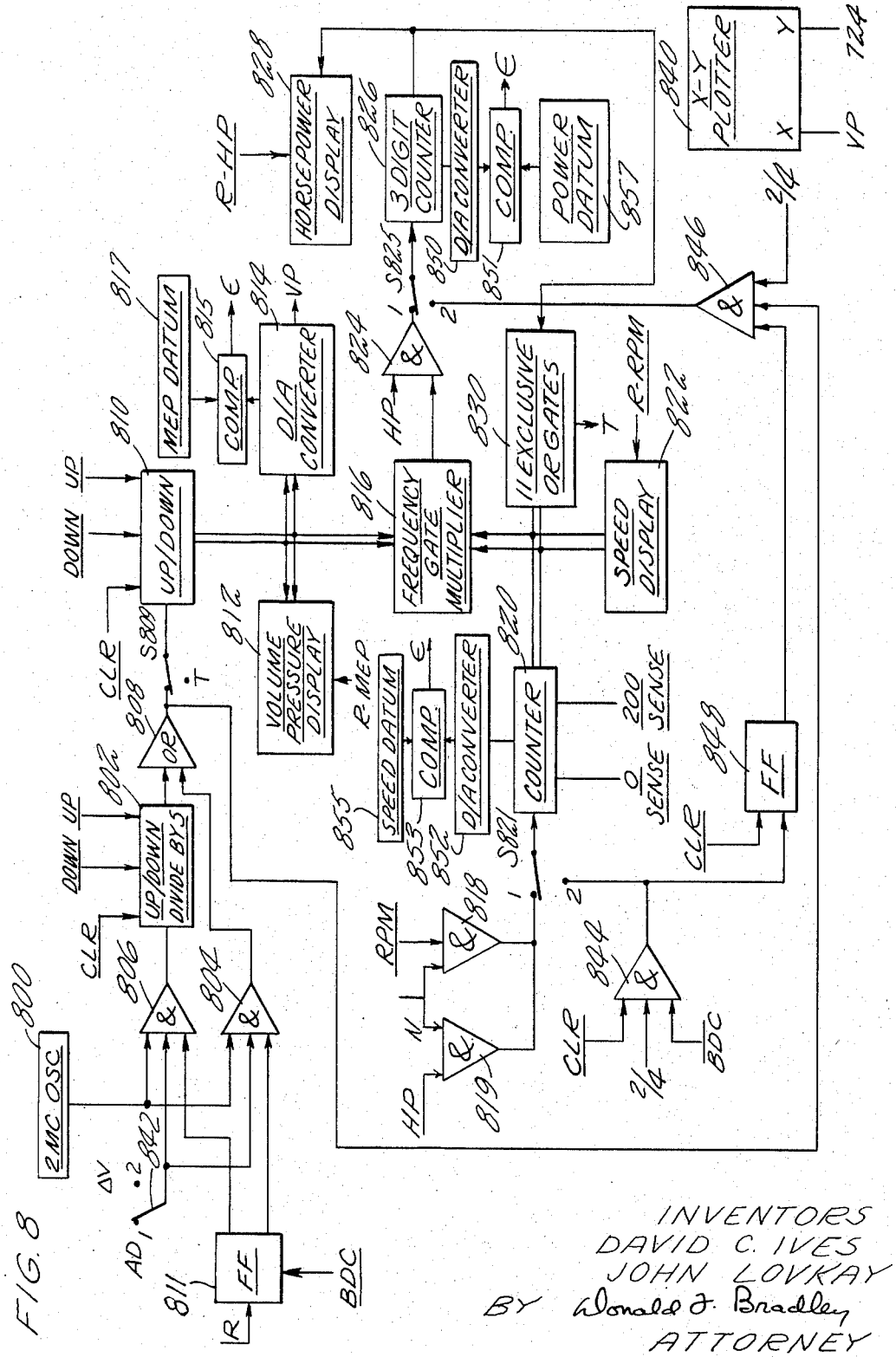

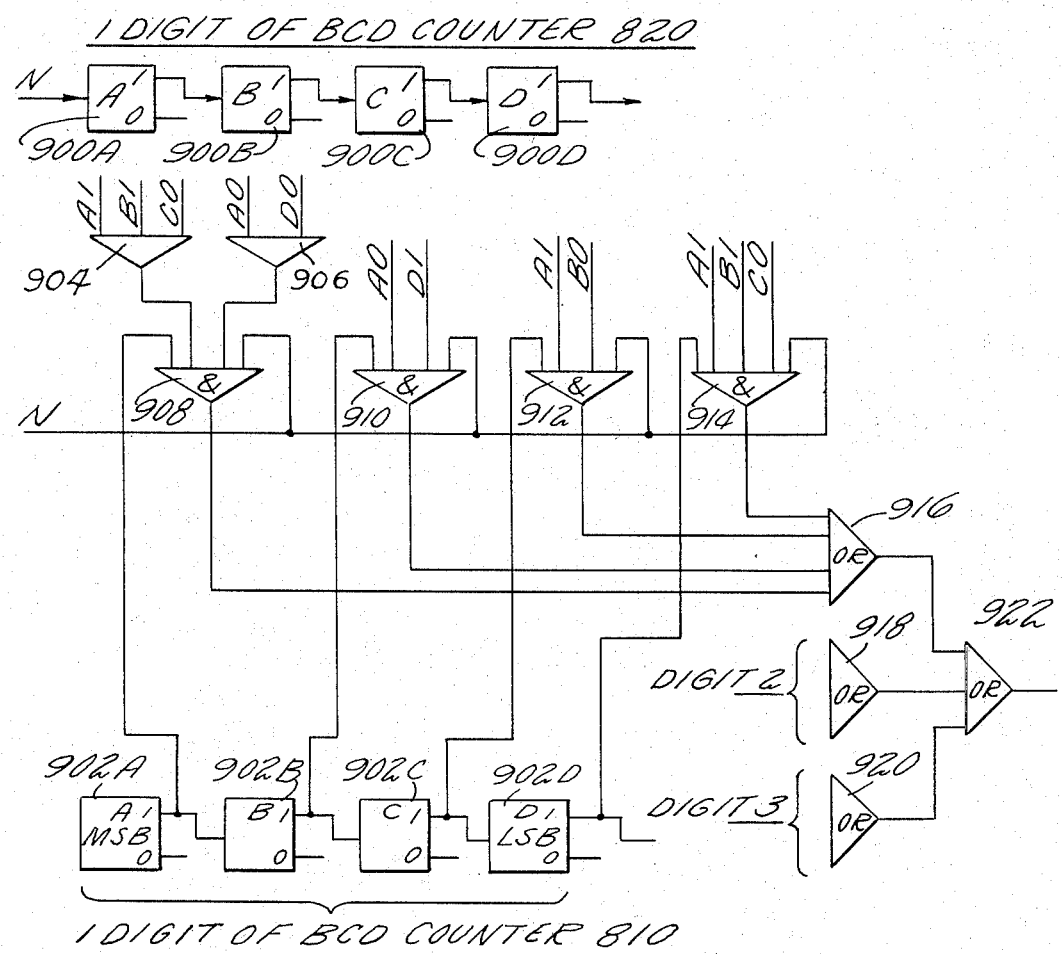

United States Patent Office 3,375,711
Patented Apr. 2, 1968

3,375,711
ENGINE PERFORMANCE INDICATOR AND COLLECTOR
David C. Ives, Rockville, and John Lovkay, Thompsonville, Conn., assignors to United Aircraft Corporation, East Hartford, Conn., a corporation of Delaware
Filed May 13, 1965, Ser. No. 455,367
15 Claims. (Cl. 73—117.2)

ABSTRACT OF THE DISCLOSURE

A digital mean effective pressure, indicated horsepower, speed, and P–V plotting device is described for a poistive displacement engine. A digital equivalent of the pressure in the cylinder of the engine is obtained at a plurality of equal volume increments displaced by the piston in the cylinder. The computed mean effective pressure is stored in a register and a subsequent horsepower computation is performed by producing a train of speed pulses and selecting a preselected number thereof for computing the indicated horsepower. The speed pulses are counted for a known time period to provide an indication of the speed of the engine. A real time device for plotting of the pressure-volume curve of the cylinder volume displaced by the piston is provided utilizing similar circuitry employed for computing the mean effective pressure and the horsepower parameters. In addition a real time control of the computed parameters is provided.

---

The field of reciprocal engines are defined herein to include compressors as well as prime movers. Although this invention is shown in combination with a reciprocating engine, it should be realized that it may also function with other types of engines such as the rotary Rankine type. In a reciprocal engine an indication of its performance is provided by a knowledge of the indicated horsepower (IHP). The IHP is defined by subtracting from the shaft horsepower the friction losses presented by the mechanism for transferring the power from the cylinders to the shaft.

The IHP is equated to the performance characteristic of the engine by the formula $$IHP = PLAN/33{,}000$$

where:

P is the mean effective perssure (MEP)
L is the length of the cylinder stroke,
A is the area of the piston, and
N is the speed in revolutions per minute.

The mean effective pressure is defined as the constant pressure that, acting during the expansion stroke, would produce the same net work that is obtained by the variable pressure acting during both the expansion and compression strokes. Stated analytically, this becomes $$MEP = \frac{\text{net work}}{\text{piston displacement (or volume } V)} = \frac{W}{V}$$

In a two-stroke compressor, mean effective pressure can be obtained from a pressure versus volume (P–V) diagram. By computing the area enclosed by the P–V diagram and dividing by the displacement, an indication of the mean effective pressure is obtained.

In the prior art the MEP measurement involved a plotting of the pressure versus volume during an engine cycle and then manually integrating with a planimeter to arrive at an indication of the area within the P–V curve. These steps are manual, laborious, and susceptible to errors. Furthermore, the length of time required to obtain a reasonable indication of the mean effective pressure and subsequently indicated horsepower renders it difficult to quickly assess the performance of an engine in the field. If in addition, it is desired to correct for a faulty performance of the engine as indicated by the MEP or IHP, then additional delay is encountered when the effect of the correction of the faulty indication cannot be observed without a repeat of the laborious prior art measurements.

In a reciprocal engine, work or power losses are encountered at the intakes and discharge ports. The intake or suction valve pressure loss ($P_{sv}$) is defined as the pressure differential between the intake or suction pressure ($P_s$) and the cylinder pressure ($P_c$) during that time when $P_s$ is greater than $P_c$ then $$P_{sv} = (P_s - P_c) \text{ for } P_s > P_c$$
$$P_{sv} = 0 \text{ for } P_s < P_c$$

Further, if the discharge or exhaust pressure loss ($P_{dv}$) is defined as the pressure differential between the discharge pressure ($P_d$) and the cylinder pressure ($P_c$) during the time when the discharge pressure is less than the cylinder pressure, then $$P_{dv} = (P_c - P_d) \text{ for } P_c > P_d$$
$$P_{dv} = 0 \text{ for } P_c < P_d$$

If either $P_{dv}$ or $P_{sv}$ are analyzed in a similar fashion as the MEP, then the mean effective discharge pressure loss (MEDP) and the mean effective suction pressure loss (MESP) are obtained and these measurements may in turn be used to compute the horsepower losses encountered across the suction port (SHPL) and discharge port (DHPL).

If the MEP, MEDP, or MESP measurements or their horsepower equivalents are unacceptable, it is possible by changing an engine parameter such as the cylinder chamber volume, fuel mixture or timing, or fuel feed or speed to improve the engine performance. If these quantities can be measured in a real time or rapid manner, it will be possible to automatically control the engine and provide for continuous optimization of the engine performance during operation.

It is therefore an object of this invention to provide an engine performance indicator.

It is another object of this invention to provide a control of an engine in response to engine parameters computed by an engine performance indicator.

It is a further object of this invention to provide a digital analyzer of an engine to obtain performance data of the engine.

It is a further object of this invention to provide a digital performance indicator for computing the mean effective pressure of an engine.

It is a further object of this invention to provide a digital performance indicator for computing the mean effective suction pressure loss of an engine.

It is a further object of this invention to provide a digital performance indicator for computing the mean effective discharge pressure loss of an engine.

It is a further object of this invention to provide a digital performance indicator for computing the power losses across the discharge and intake ports of an engine.

It is a further object of this invention to provide a digital computer for computing the mean effective pressure and the indicated horsepower of an engine, and provide a control signal for actuating an adjustable mechanism on the engine to optimize the performance of the engine.

It is a further object of this invention to provide a real time display of computed engine performance data of an engine.

It is a further object of this invention for providing a display of the mean effective pressure and the indicated horsepower and the speed of an engine.

It is a further object of this invention to provide a quick and efficient method for computing the mean effective pressure of a reciprocal compressor or a reciprocal prime mover.

It is a further object of this invention to provide a method of computing the indicated horsepower and the speed of a reciprocating compressor and/or reciprocating prime mover.

It is another object of this invention to provide a device capable of analyzing a reciprocal engine in a very short time and in a very efficient manner.

These and other objects of this invention will become more readily apparent upon a review of the following description and the accompanying drawings.

In the drawings:

FIGURE 1 discloses the system aspects of this invention wherein a reciprocating prime mover drives a reciprocating compressor and the engine analyzer is shown in combination therewith.

FIGURE 2 discloses a typical pressure volume curve for a two-cycle reciprocating engine.

FIGURE 4 shows the timing cycle of the analyzer.

FIGURE 5 shows the mechanism involved for obtaining the timing signals necessary for driving and controlling the computer circuitry generally indicated in FIGURE 8.

FIGURE 6 shows the transducer system for measuring the speed of the engines and for providing critical piston displacement signals.

FIGURE 7 shows the pressure transducers and associated analog-to-digital converter equipment.

FIGURE 8 shows the computer and display section of this invention.

FIGURE 9A shows the mechanism involved for computing the product of speed times mean effective pressure.

Figure 3:
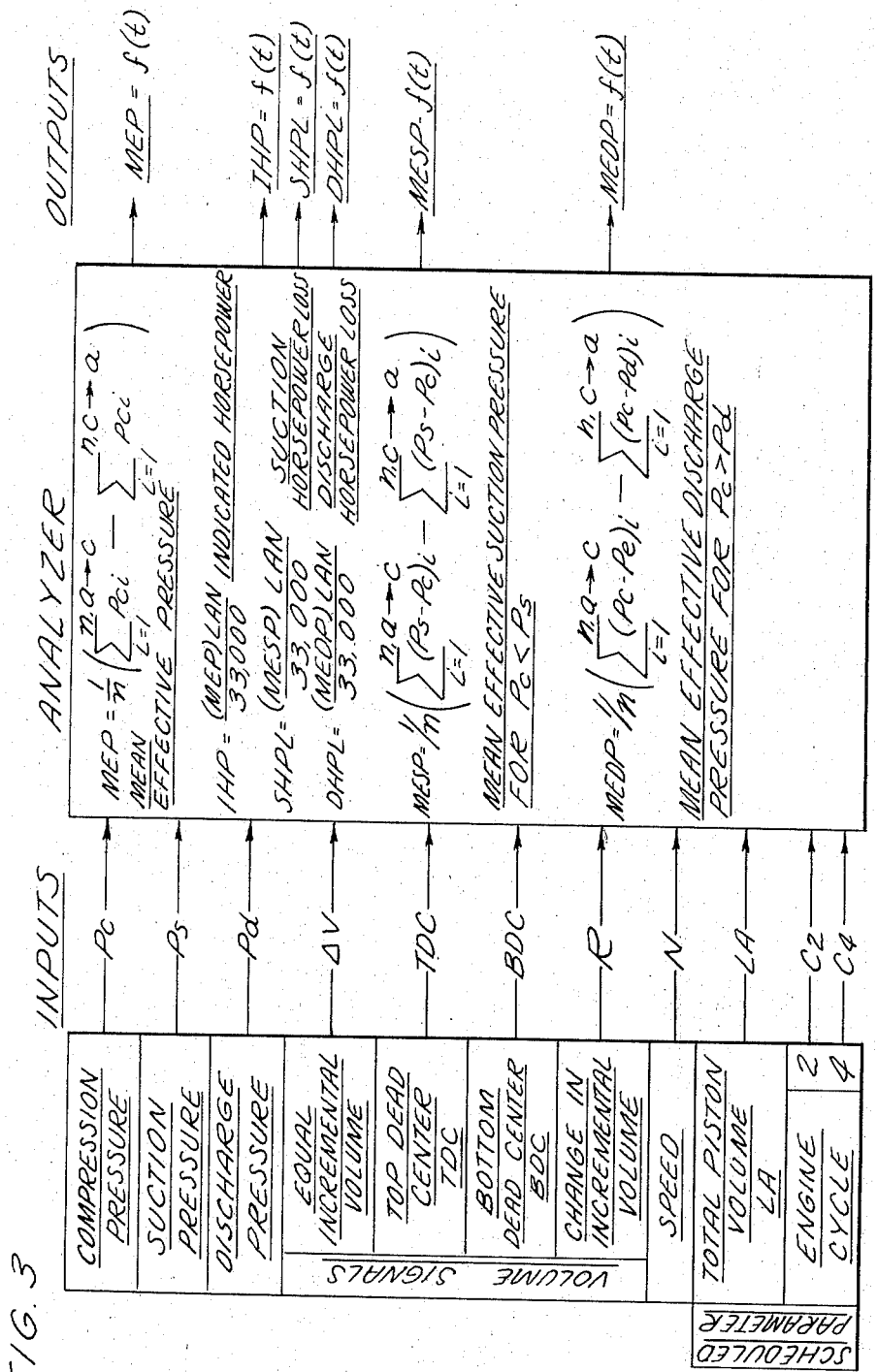
FIGURE 3 shows the inputs to the analyzer, the computer functions performed by the analyzer and the computed outputs.

In this invention the mean effective pressure and indicated horsepower of an engine are computed by digital circuitry. The analog pressure signals are converted to digital equivalents and a corresponding swept volume signal is generated to permit integration of the area enclosed by the P–V curve of the engine. By proper scaling the mean effective pressure signal is computed and displayed. The digital equivalent of the speed of the engine is used together with scheduled information as to piston stroke length L and its area A and the previously computed MEP to compute and display the indicated horsepower. In addition, the power losses and pressure losses encountered by the suction and discharge ports may be computed and displayed. The computed data may then be used in a closed loop control to automatically control the engine.

In the following a preferred embodiment of this invention is described in relation to a reciprocal compressor. It should be realized, however, that this invention is also applicable to prime movers. Although this embodiment is only described for a single cylinder, multiple cylinder engines may utilize this invention, in which case the complete engine performance bears a simple additive relationship to the individual performance of each of its cylinders.

In FIGURE 1 the prime mover of which a single cylinder 100 is shown drives a shaft 102 which in turn is coupled via linkage 104 to the compressor of which, again, a single cylinder 106 is shown. In this embodiment a single shaft 102 powered by the prime mover is used to convey the power to the compressor, but in alternate arrangements multiple shafts coupled by appropriate gearing may be used.

The compressor comprises a piston 108 which moves slidably in cylinder chamber 110. A single-acting piston is shown but, of course, this invention would equally work with a double-acting piston. At the top of the chamber 110 is an intake valve 112 and a discharge valve 114. Also, in the top of the chamber is a small, variable volume piston 116 the position of which may be altered to vary the volume of the region to be compressed by the piston 108. Within the top region of the cylinder 110 is a pressure transducer $P_c118$ capable of following the rapid pressure variations encountered during a typical compression cycle. Similarly, on the intake side of the valve 112 is a pressure transducer $P_c120$ and on the discharge side of the valve 114 is a pressure transducer $P_c122$.

The prime mover cylinder 100 has similar transducers with similar symbols as the compressor and are indicated at 124, 126, and 128. The cylinder pressure transducer 126 in this case must have the additional characteristic of being capable to withstand the unusually high temperatures encountered in a combustion chamber.

The analyzer 132 is shown connected to amplifier 134 for driving the motor 136. The analyzer has a variety of inputs necessary for the computing functions and these are pressure, volume, speed and others to be explained in more detail hereafter. For servo control operations a datum input 150 is shown.

In a two-stroke or two-cycle compressor, the mean effective pressure can be obtained from a P–V diagram of the type shown in FIGURE 2 by calculating the area enclosed by the curve and dividing this by the displacement. If the piston displacement is divided into a number of equal volume increments, $\Delta V_s$, the area $abcd$ could be estimated as the sum of the areas of each rectangle having the height $P_1, P_2$, etc. Thus, $$\text{Work area} \cong \frac{V_s}{\eta}\left(\sum_{i=1}^{n} P_i\right)$$

And since $MEP = W/V_s$ $$MEP = \frac{1}{\eta}\left(\sum_{i=1}^{\eta a \to c} P_i - \sum_{i=1}^{\eta c \to a} P_i\right)$$

where $\eta$ is the total number of volume increments for which a pressure sample is taken, and "$a$" corresponds to the bottom henter position of the piston 108 and "$c$" the top dead center position.

In FIGURE 3 the inputs, computer functions and outputs are summarized for this invention. The similarity between the MEP, MESP and MEDP formulas suggests the versatility of this invention in that identical circuitry may be used to compute them. The same may be said for the computation of IHP, SHPL and DHPL.

In FIGURE 3 the pressure inputs comprise three signals: cylinder pressure, $P_c$; intake or suction pressure $P_s$; and discharge or exhaust pressure $P_d$. These pressure signals are derived from analog transducers capable of following the rapid cylinder pressure fluctuations with its high harmonics. The analog-to-digital conversion thereof will be described in greater detail in relation to FIGURE 7.

The volume signals used for activating essential timing functions are equal incremental volume (or displacements) $\Delta V$; the top dead center and bottom dead center positions of the cylinder, TDC and BDC, respectively; and change in equal incremental volume signal R. The detection of these signals will be described in more detail in relation with FIGURE 6. Their utility will be described in relation with FIGURE 8, the system diagram.

The input speed, N, in revolutions per minute consists of pulses and will be described in greater detail in relation to FIGURE 6.

In addition to these inputs, a variety of scheduled inputs are supplied. These are constant parameters for each individual engine and are: total piston swept volume (stroke times area), LA; engine cycle, 2 or 4; and maximum pressure scaling factors, not shown in FIGURE 3. Since engines and compressors may operate at widely varying pressures, simple scaling factors may be scheduled for each engine. These scheduled parameters will be described in greater detail in relation with the remaining figures.

The formulas solved by the analyzer are summarized in FIGURE 3 and have been explained in relation with the foregoing theory. Though the embodiment herein described discloses solving all of the formulas, any one individually may be solved utilizing the essential features of this invention.

Since the analyzer is capable of synchronous and repetitive operation, the outputs shown in FIGURE 3 may be obtained as a function of time although it is, of course, also possible to provide a single discrete output value. Although not shown in FIGURE 3, the $P_c$, $P_d$, and $P_s$ signals may also be provided as a function of swept volume for displaying the P-V curves on cathode ray oscilloscopes or plotters.

In addition to the inputs described in relation to FIGURE 3, the analyzer utilizes internally generated signals for controlling the synchronous operation of the device.

The synchronous operation is controlled as shown in FIGURE 5 by an 1.65 kc. pulse oscillator 502 feeding its pulses into a thirteen-stage binary counter 504. The maximum count therein is an equivalent decimal 8192. At various time intervals starting from a count of zero, timing signals will be needed to initiate particular computing functions. These timing signals are derived by decoding the counter in the customary manner of feeding selected sides of the binary stages in counter 504 into thirteen input wide AND gates 512a through 512h. The signals decoded hereby are:

Zero: C-HP which initiates the horsepower computation as shown in line 400 in FIGURE 4.
200-5000: S-HP which terminates the horsepower computation.

This signal is decoded in a different manner from the others in that the binary counter outputs are connected to two of the terminals of corresponding double-throw, single-pole switches generally indicated at 514. The poles in turn are connected to the 13 input wide AND gate 512(6).

This arrangement permits the termination of the horsepower computation any time within prescribed period indicated by the arrow on line 400 of FIGURE 4. The switches 514 are located on the front panel of the analyzer, and as will be hereinafter explained are used to schedule the LA/33,000 factor of the engine cylinders under analysis.

5002: R-HP occurring as shown on line 402 of FIGURE 4 constitutes the decode signal for reading the computed horsepower figure into a digital display 828 in FIGURE 8 and perform other logical functions such as clearing the RPM counter 820 shown in FIGURE 8.
5004: 5334 defines a prescribed interval of time (.2 second) during which the speed signal N, consisting of pulses, is permitted to feed into the RPM counter 820. The accumulated count represents the speed in revolutions per minute.
5336: R-RPM, occurs right after the computation of the speed computation as shown on lines 404 and 406, and reads the computed RPM into a display 822 shown in FIGURE 8.
5338: C-MEP, and 8190 R-MEP define, respectively, the commencement and termination of the mean effective pressure computations as shown in lines 408 and 410 of FIGURE 4. In addition, the R-MEP signal reads the computed MEP value into the MEP display 812 shown in FIGURE 8.

In addition to these timing signals which are pulses, several level or time interval signals are generated. Thus, the C-HP and S-HP pulses are fed into a flip-flop 506 which produces the HP signal indicative of the time interval that the horsepower computations may take.

The C1-RPM and C2-RPM are connected to the inputs of flip-flop 508 to generate the RPM interval signal indicative of the computation time for computing the speed of the engine.

In a similar fashion C-MEP and R-MEP are connected to the flip-flop 510 to generate the I-MEP interval signal indicative of the computation time for the MEP computations.

As previously mentioned, several critical volume signals are needed to initiate and adjust the computations. FIGURE 6 shows the means by which these signals are obtained. A disc 130 is connected to the end of the crank shaft 102 as shown in FIGURE 1. Transparent slits inscribed and arranged in circular patterns on the disc are then positioned to correspond to various volume increments swept by the piston 108. FIGURE 6 shows on the disc 130 five circular patterns; they are the equal volume increments ΔV, 400; the speed increments N, 402; the change in equal volume increment R, 404; the bottom dead center increment, BDC, 408; and the top dead center increment, TDC, 406. Lamps 410a through 410e are positioned on one side of the disc to illuminate the circular patterns by means of lenses 412a through 412e and photocells 414a through 414e are positioned on the opposite side of the disc to produce an electrical signal each time a slit is rotated between the light source and a cell. The photocell outputs are amplified by amplifiers 416a through 416e and then passed through variable delays 418a through 418e to produce the digital input pulses ΔV, N, R, BDC, and TDC. The relationship that these signals bear to the volume swept out by the piston 116 will be more clearly described in relation to FIGURE 8.

In addition, the switch 620 is provided for the event a double-acting cylinder is analyzed. In such cases the TDC and BDC signals are to be reversed for one end.

The ΔV pulses represent equal volume increments displaced by the piston 108, for instance each pulse represents 1/200 of the displacement from BDC to TDC and vice versa. The disc 130 is mounted on the shaft 102 which in turn drives the piston 108 forward and backward through the linkage 104. The rotation of the shaft 102 may be mathematically related to the volume swept by the piston 108 but because of the linkage 104 this may be a complicated relationship. For instance, the rotation of the shaft 102 may be related to the volume swept by the piston 108 by a sine square function. Since it is, of course, desirable to simplify the MEP computations and minimize the circuitry requirements, equal volume increments are needed and the spacing between the slits on the circular pattern 400 will be irregular.

The speed of the piston 108 is directly related to the rotation of the shaft 102 and therefore an indication of the shaft speed by regularly spaced slits in the circular pattern 402 provides an indication of the revolutions per minute of the piston 108.

For logical operations of the digital analyzer, a knowledge of the bottom dead center and top dead center of the piston 108 must be known, and separate circular patterns 606 and 608 are provided to detect these positions. The change in equal volume increment signal R is used to signify a change in the rate of ΔV pulses, i.e., each ΔV pulse now signifies 1/1000 of the piston displacement between TDC and BDC. The need for such a change in rate will be explained later as a trade-off to preserve the accuracy of the computations.

The piston displacement slits on the disc 130 must all be carefully aligned so that there will be an accurate time relationship between the pulses and the corresponding actual piston displacements. Since some misalignment may sometimes occur, as can readily be visualized within practical reproduction tolerances, it is convenient to correct them by making a fine adjustment of the timing relationships with highly accurate delays 618a through 618e. Continuously adjustable accurate delays are hard to come by so that discrete delay lines may be combined to produce the desired delay.

The analog-to-digital conversion of the pressure signals is shown in FIGURE 7. The cylinder pressure transducer 700, the intake pressure transducer 702 and the discharge pressure transducer 704 are indicated together with appropriate shaping networks 706a, 706b and 706c. Each of the outputs of the shaping network feeds into an amplifier 708a through 708c. The outputs of the amplifiers are connected through a switch 709 to an analog-to-digital converter 730. As shown in FIGURE 7 the switch 709 feeds the $P_c$ pressure signal to a differential amplifier 710. This amplifier is of common design and provides a difference signal between two input signals. With 709 in the shown position the difference signal is that between $P_c$ signal and ground. In other positions the switch 709 may be connected to provide the pressure difference signals needed for the MESP and MEDP computations shown in FIGURE 3. The function of the switch 709 is to allow the same circuitry to be used for each of the MEP computations. It is, of course, a simple expedient to provide additional circuitry so that each of these computations may be performed simultaneously.

The output of the differential amplifier 710 is then connected to a sample and hold circuit 722 which is synchronized and activated by the equal volume increment pulse $\Delta V$. The pressure signal will be stored and held for the interval between $\Delta V$ pulses at the input of an analog-to-digital conversion circuit generally indicated at 730 until a new conversion is commanded by the subsequent $\Delta V$ pulse.

The analog-to-digital conversion circuitry 730 also comprises circuitry shown in FIGURE 8. The circuitry 730 in FIGURE 7 is used to produce a signal AD which has a time interval proportional to the amplitude of the pressure signal stored in the sample and hold circuitry 722. The signal AD then enables the 2 mc. oscillator pulses, 800, to pass through either AND gate 806 or 804 depending upon the state of flip-flop 812. Consequently, the pulses from AND gates 804 and 806 are the pulse or digital equivalent of the analog pressure signal.

More specifically the time equivalent signal is obtained as follows. A $\Delta V$ pulse during the MEP computation cycle triggers the ramp generator 712. The ramp generator 712 feeds into two comparators 714 and 716. The other input to comparator 716 is a signal which is proportional to zero pressure signal, in this case ground potential. Thus, if the ramp generator starting from a level below ground potential reaches ground level, the comparator 716 produces an output signal 718 proportional to zero pressure. This zero pressure signal will activate the flip-flop 520 to initiate the time equivalent signal AD. As the ramp generator signal increases and reaches the level of the pressure signal 724 stored in the sample and hold circuit 722, the comparator 714 connected to the output 724 produces an output signal 726 which will reset the flip-flop 720 and terminate the time equivalent signal AD and the analog-to-digital conversion. The output from the comparator 714 is used by means of the inverter 728 to prevent the comparator 716 from interfering with the termination.

In FIGURE 8 the computer section of this invention is shown. The AD pulse permits the passage of the pulses from the two-megacycle oscillator 800 to enter either through AND gates 804 or 806 and subsequently OR gate 808, the up-down counter 810. To discriminate between the positive and negative work in the engine cycle a conventional up-down counter is used to accumulate the counts. In most cases between BDC and TDC the counter is counting up whereas from TDC to BDC the counter will be counting down. For this reason the BDC and TDC pulses 624 and 626 shown in FIGURE 6 at the output of switches 620 are connected to the two inputs of flip-flop 622 to produce the UP and DOWN level signals for control of counter 810. The pulse equivalent of each pressure signal measured between BDC and TDC will be added to the total count. Upon the occurrence of TDC and the subsequent DOWN signal a reversal of the up-down counter to the down mode will occur and the digital pressure signals measured between TDC and BDC will be subtracted from the accumulated count in counter 810. The net count at the end of an engine cycle will be the work area from which the MEP can be derived.

According to standard information and sampling theories the required number of divisions of piston displacement must be determined taking the accuracy required and the engine speed into account. The number of divisions will determine the sampling rate of the pressure signal and therefore the maximum harmonic frequency that can accurately be followed. By increasing the sampling rate, a better approximation can be obtained of the original signal which is being digitized. Further, to obtain good resolution it is essential that the digitized pressure pulses be as high as possible for each sample. Since the analog-to-digital conversion time of the largest pressure signal must remain less than the smallest sampling period (i.e., smallest interval between equal volume increment pulses $\Delta V$), a trade-off between sampling rate and accuracy is necessary to achieve optimum performance.

To arrive at the optimum sampling rate the facts that the incremental volume slits are irregularly spaced along the circular pattern 600 in FIGURE 6 and the speed of rotation of the shaft 102 must be taken into account. For instance, if 200 equal volume increments or displacements are taken between TDC and BDC the minimum slit spacing ($\Delta \theta$) in crank angle degrees may be .56° which occurs at a crank angle of about 90°. This value and others following are of course dependent upon the type of linkage 104 used but will suffice here for explanation. Hence $$\Delta\theta \text{ min.}=.56° \text{ @ } \theta \simeq 80° \text{ to } 90°$$
$$\Delta\theta \text{ max.}=9.06° \text{ @ } \theta \simeq 170° \text{ to } 180°$$

If the shaft 102 rotation varies, for instance, from 125 to 650 r.p.m. there is a maximum time ($t_s$ MAX) interval between sampling pulses at the lowest rotation and a minimum time ($t_s$ MIN) at the highest rotation encountered. Thus following the formula $$t_s = 166\frac{\Delta\theta}{N}$$

where $t_s$ is in milliseconds and N is the shaft speed in r.p.m.

$$t_s \text{ max.}=12 \text{ milliseconds}$$
$$t_s \text{ min.}=.143 \text{ millisecond}$$

It can thus be seen that a longest sampling interval of 12 milliseconds will reduce the maximum frequency response and the shortest sampling interval reduces time available for conversion. Although a speed up of the conversion time is well within the capability of present day equipment, the need for logic circuitry capable of higher operating speeds affects the costs of the equipment and it would be desirable to reduce these within acceptable levels for the engines to be analyzed. In any event, it would certainly be possible to construct a converter for automotive engines operating at speeds in excess of 5000 r.p.m.

To improve the frequency response at the low speeds a change in the sampling rate is shown in the circular pattern 600. In this instance the sampling rate is 1/1000 of the displacement between BDC and TDC and between TDC and BDC. The change occurs in regions near $\Delta\theta$ max. In order to correct the computations for this change in the sampling rate the circular pattern 604 is used to produce a change in equal volume increment signal R. This is then applied to the input of flip-flop 811 in FIGURE 8 which in turn determines whether the pressure pulses are to be fed directly to the up-down counter 810 via OR gate 808 or be first fed through up-down divide-by-five counter 802.

The counter 802 in this instance divides by five because of the 5:1 relationship between the rates of equal incremental volume signals. Of course different ratios could be used.

The R pulse will trigger the flip-flop 812 and reverse its gating functions on gates 804 and 806. Since the synchronization may sometimes be in error, the BDC signal is directly gated to the flip-flop 812 to assure that it has the proper synchronization with the R pulse.

The output of OR gate 808 is connected via switch 832 to up-down counter 810. The output of the up-down counter 810 is connected to a volume pressure display 812 and a ten-bit digital-to-analog converter 814 and also to a frequency gate multiplier 816 to be hereafter described. The display 812 is intended for the computed mean effective pressures MEP, MESP and MEDP. The ten-bit digital-to-analog converter 814 is intended to provide an analog equivalent of the mean effective pressure signals to provide signals for engine control.

The use of the speed signal N in the horsepower computations and for its display is also shown in FIGURE 8. The signals N and RPM are connected to AND gate 818, and the N and HP signals are connected to the inputs of AND gate 819. Both outputs of AND gates 818 and 819 are fed through switch 821 to counter 820. The output of counter 820 is then connected to the speed display 822, the frequency gate multiplier 816 and the digital-to-analog converter 852. The output of the frequency gate multiplier is connected to the AND gate 824 which has the HP signal as another input. The output of AND gate 824 is connected through switch 825 to the counter 826 which in turn is connected to the horsepower display 828, the eleven exclusive OR gates 830, and the digital-to-analog converter 850.

The up-down counters 810, 820 and 826 are conventional binary coded decimal counters comprising respectively five decimal digits for counter 810 and three for the others. These counters are well known in the art and provide the standard 8, 4, 2, 1 codes for each decimal digit. Although four binary stages are capable of counting to 16 they are arranged in such a manner that after the 9th count a spill over into the next highest digit will occur. The counters have been described as connected to various other devices, and to distinguish a serial single line connection from parallel multiple line connections, the latter are shown with double lines in FIGURE 8.

The Down and Up counting capabilities may be simply accomplished by appropriate reverse gating.

To compute MEP(s), RPM and Horsepower(s) an LA must be programmed in binary on the 13 toggle switches 514 and the maximum cylinder pressure (not shown), engine type (2 or 4 cycle), cylinder end, and gain and scale select switches (not shown) should be scheduled.

The cylinder pressure transducers 700, 702 and 704 outputs will be amplified by 5 when the gain and scale select switch is set at ×1.0. The amplifiers 708a, 708b and 708c whose maximum level is +5 volts, will go directly to the sample and hold circuit 722 which is the input to the analog-to-pulse converter 730. After several seconds of operation, to permit synchronization, the system will begin to produce information. The MEP calculation, which will be initiated by pulse C-MEP from the 1.65 kc. clock into the master timing control counter, will begin after receipt of the first bottom dead center pulse. The arrival of the first BDC pulse causes the I-MEP line to activate and feed the equal volume increment pulses ($\Delta V$) into the analog-to-pulse conversion circuitry. Each $\Delta V$ pulse will initiate two operations. The first is the sample and hold circuit 722, which will sample the amplified pressure voltage at that point in time and store it for the duration of the conversion. The second is the triggering of the ramp generator 712 which will begin the conversion process. The ramp voltage will begin slightly negative and remain so during the initial non-linear operation. As the voltage increases through zero, the first comparator 716 will generate a start conversion pulse 718 which will set the conversion control flip-flop 720. This will permit signal AD to gate 2 megacycle pulses into a 5 decimal digit MEP up-down counter 810. The ramp voltage will increase linearly from zero toward the level of the temporarily stored transducer voltage. A second comparator 714 will monitor the ramp and pressure voltage until they become equal, at which time a second signal will clear the conversion control flip-flop 720 and block any further 2 mc. pulses from entering the MEP counter 810.

The period of time which occurs between zero crossover of the ramp and the point at which the ramp voltage equals the transducer voltage is proportional to the cylinder pressure, and the number of pulses gated during this period represents a pressure count. Since the turn on and the turn off of the counting period is initiated by two identical comparators, any turn on delay is offset by an equal turn off delay and the count period error is cancelled.

As previously explained the MEP, MESP and MEDP computations require that the area enclosed by the P-V diagram be computed and divided by the displacement. The computer accomplishes this by integrating the pressure signals during the compression and expansion strokes at equal displacements of the piston 108. Since the displacements are equal, the division becomes a mere scaling factor that is designed into the computation and simplifies the circuitry. Hence, upon initiation of the I-MEP interval the mean effective pressure computations commence by allowing the digitized pressure signals to accumulate in the up-down counter 810. During compression the counter 810 is counting up and during expansion it is counting down. At the end of the interval a properly scaled count is present in the counter 810 and upon the occurrence of the read R-RP or pulse this count is transferred to the display 812.

Between the BDC and TDC inputs exactly 220 equal volume pulses $\Delta V$ will occur and each one will initiate another burst of pulses to be counted up by the MEP counter 810. The first 15 equal volume increment pulses from BDC will represent $\frac{1}{1000}$ of the total volume swept. Proper scaling is provided by the divide-by-5 up-down counter 802 maintained here in the up count position. The receipt of a change in volume increment signal R at the end of the 15th increment will switch out the divide-by-5 circuit and prepare the system for equal volume increments of $\frac{1}{200}$ of total volume. There will be 195 of these as the crankshaft proceeds towards TDC. At the end of this sequence, another R pulse will occur and the rate of sampling will return to $\frac{1}{1000}$ volume increments for the remainder of the half cycle. At TDC, the MEP counter 810 and divide-by-5 counter 802 will be reversed to a down count mode and each of the next 220 equal volume pulses which occur between TDC and BDC will initiate a burst of pulses which will be counted down by the MEP counter. For a crank cylinder end measurement as opposed to the head cylinder end under discussion, the forementioned TDC and BDC positions will be reversed with the use of switch 620. At the end of one complete revolution of the engine, the resulting count in the MEP counter will represent the difference between the pressure summation on the compression stroke and the pressure summation on the expansion stroke. This will represent the area within the familiar P-V curve and will always be a positive number.

The number of engine revolutions that must be counted is proportional to the magnitude of the actual maximum cylinder pressure that may be encountered. If different transducers are used for varying ranges e.g., 0–800 p.s.i., 0–1600 p.s.i., the required scaling may be accomplished by selecting the number of engine revolutions over which a count will be accumulated.

Another scaling factor which must be provided is the 2 or 4 cycle engine. This can be handled in a similar manner by counting a 4 cycle engine over twice as many revolutions as a 2 cycle engine and may be programmed by a two-position "Cycle" select switch (not shown).

The horsepower computations required solving of the equation $(MEP) \, LAN/33{,}000$ as previously explained. Since the $LA/33{,}000$ is a constant for each engine the number is programmed on the switches 514. These switches are programmed to control the duration of the $(MEP) \times N$ product, i.e., horsepower computation performed by the frequency gate multiplier 816.

State 0 of the control counter 504 will initiate the horsepower computation, the speed pulses, N will begin feeding into the RPM counter 820 via AND gate 819 under control of the HP signal. The RPM pulses will be gated into binary submultiples within each decimal stage, as shown in FIGURE 9. The corresponding stages of the MEP counter 810, which contain the previously computed MEP number, will enable or disable each of the RPM gated frequency submultiples, depending on whether the MEP bit at that location is a 1 or 0, respectively. Thus, the number of pulses per unit time from each frequency gate will be proportional to the value of the MEP bit at that point. To prevent pulses from becoming superimposed, the gating throughout the entire frequency gate multiplier has been designed such that no two pulses will occur at the same time. All of the frequency gated pulses are combined into a single pulse train, whose frequency is now proportional to $K \times MEP \times RPM$. These pulses are fed into a horsepower counter 826 composed of decimal up count stages. In 4 cycle operation, a divide-by-2 stage (not shown) preceeds the counter 826 stages, to provide for the alternate power strokes. The count period, which is controlled by the master timing control counter, will vary proportional to the programmed LA. The result in the counter 826 will be read into the horsepower display 828 by the R-HP timing signal.

Figure 9B:
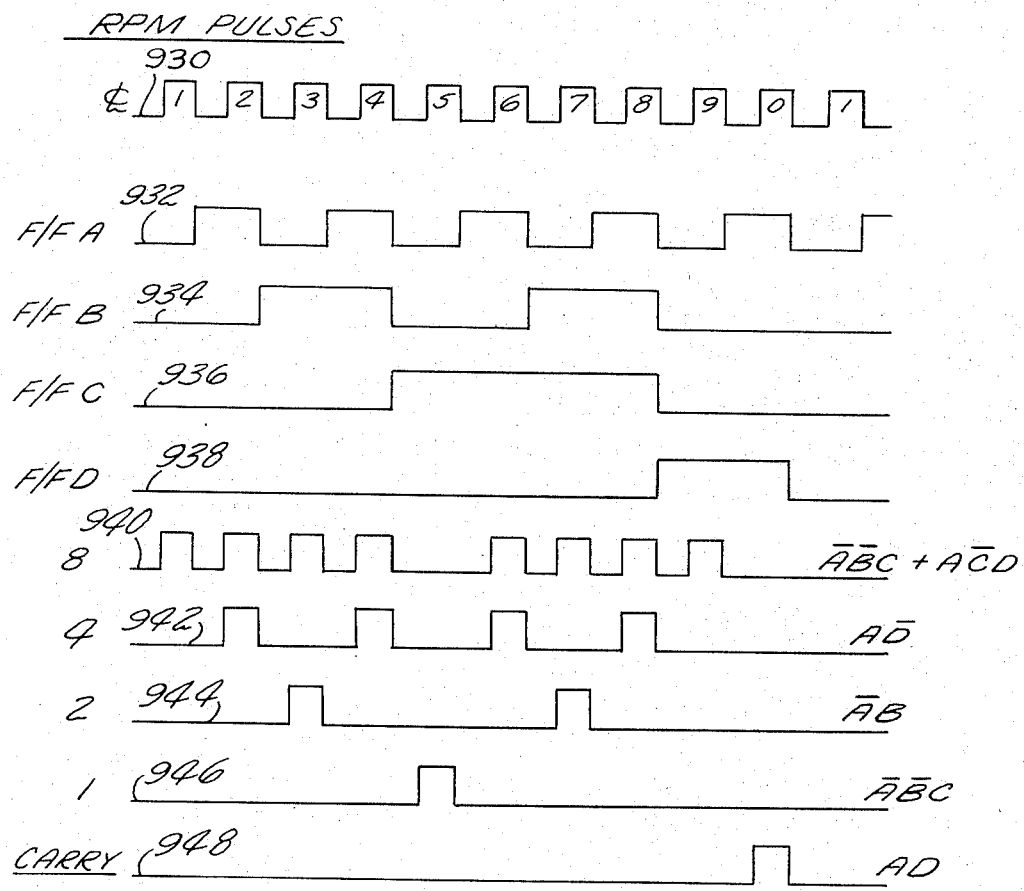
FIGURE 9B shows the timing of the mechanism indicated in FIGURE 9A.

The frequency multiplier 816 is shown in more detail in FIGURE 9A and its basic timing operation is shown in FIGURE 9B. The speed pulses N are connected to the input flip-flop 900a of counter 810. The first digit of the BDC counter 810 consisting of the four binary counters 900a, 900b, 900c and 900d only are shown since the understanding and description of the frequency gate multiplier is similar for the other digits.

In parallel with the counters 900a through 900d are the AND gates 904, 906, 908, 910, 912 and 914. The inputs to these gates are from the counters 900a through 900d and the selected sides of the counters are indicated. Other inputs are from the inverse of the speed pulses $\overline{N}$, and the "1" side of the binary counters 902a, 902b, 902c and 902d from the corresponding digit in the MEP counter 820. The most significant binary bit of the shown digit, flip-flop 902a is connected to gate 908 and in that order selectively connected to gates 910, 912 and 914 so that the least significant bit 902d is connected to gate 914.

The output of AND gates 908, 910, 912 and 914 are connected to OR gate 916. The output of gate 916 is in turn connected with outputs from similar gates 918 and 920 for other digits of counters 810 and 820 to OR gate 922.

FIGURE 9B will be explained in relation to the following description of the operation. The previously computed MEP count is stored in the counter 810. The product of $N \times MEP$ is obtained by generating binary submultiples, 8 out of gate 908, 4 out of gate 910, 2 out of gate 912 and 1 out of gate 914 of the N pulses and enabling these gates if the counter 810 input to that gate is a one.

Hence, as shown in FIGURE 9B, 10 N pulses are shown on line 930. Of course many more are detected during the horsepower computations but since the process repeats itself 10 suffice for explanation.

Lines 932, 934, 936 and 938 show the standard binary counting of the counters 900a through 900d of the N pulses. The 8, 4, 2, 1 binary submultiples may then be obtained by the NAD gating logic as shown by the connections to gates 904, 906, 908, 910, 912, 914, and 916. The triggering pulse is provided by $\overline{N}$, the inverse of N. The output from gate 908, assuming a one input from 902a is shown on line 940. The outputs from the other gates 910, 912, and 914 assuming that the 810 counter inputs are all "ones" will be respectively as shown on lines 942, 944 and 946.

The 10th pulse will generate a carry signal shown on line 948 and since this is BDC logic and activate binary submultiples in the next highest digit order in a similar manner. All the submultiples form all digits are then combined by the OR logic 916, 918, 920 and 922 to form a single train of pulses representing the product between the number in the counter 810 and the speed pulses N.

Speed is computed and displayed as follows. R-HP will clear the RPM counter in preparation for the speed computation. State 5004 will activate RPM signal and enable the N pulses to feed via AND gate 818 into the speed counter 820 in the same manner as in the horsepower computation. In this case, however, no submultiples are utilized and no multiplication is performed. The RPM pulses are summed for exactly 0.2 second, which is equal to three hundred and thirty 1.65 kc. pulses. State 5334 will terminate the N summation and the resulting count will represent a scaled speed reading in revolutions per minute. The R-RPM signal will read the RPM number into the speed display 822 and clear the MEP counter 810 in preparation for the next computation. Thus, a complete MEP, RPM and HP compute cycle has been performed and a new one may be immediately initiated and repeated in the same manner as described above.

To compute MESP or MEDP, the switch 709 is placed in the appropriate position to produce the desired difference signal as previously described. In addition the divide-by-5 counter 802 and MEP counter 810 are locked in the up count position. The master timing control counter 504 will operate identically as described with the MEP computation. The first BDC pulse which occurs after initial synchronization, will cause the MEP compute timing counter to advance to state one. Equal volume increments $\Delta V$ will begin feeding into the analog-to-pulse converter 730, but as long as $P_c > P_s$ in the case of the MESP computation and $P_c < P_d$ in the MEDP computation the amplifier 710's will have a negative output and the hold signal to the two comparators 716 and 714 will be negative. As the ramp is triggered by each $\Delta V$ pulse, the comparator 714 will immediately sense that the ramp voltage is greater than the signal voltage and will produce a "1" voltage level output. This will inhibit the comparator 716 from producing a set pulse to the conversion control flip-flop 720 and no count will be produced. When $P_c < P_s$ in the MESP computation and $P_c > P_d$ in the MEDP computation, the amplifier 710 will have a positive output so that comparator 716, the zero crossover detector, will now trigger first, to set the conversion control flip-flop 720. When the ramp voltage rises above the sampled positive voltage, the flip-flop 720 will be reset and a count proportional to the pressure difference will exist in the MEP counter 810. Since the MESP and MEDP computations always involve up counting, it can be seen why both counters 802 and 810 have been locked into this state.

As the completion of the pressure summation, the suction or discharge horsepower computation will begin and will proceed exactly as previously described for IHP. The final count will represent the power loss across the intake or discharge parts and may be displayed.

In all probability, the suction loss mode will only be performed on 2-cycle engines since transmission line losses are important and desirable to know. If a 4-cycle application is desired, it should work equally well since pressure will be summed over twice the number of cycles and horsepower will be divided by two to accommodate half the power strokes.

A most important feature of this invention resides in its capability of controlling the operation of an engine in response to the computed parameters. The efficiency may be closely controlled to its maximum by utilizing either the computed MEP, MESP, MEDP, IHP, SHPL, DHPL, or RPM parameters. These may, for instance, be computed simultaneously or serially as described herein.

The computed functions may be applied in digital format directly to the engine parameters to be controlled or an analog equivalent may be generated with digital-to-analog converters 814, 850 and 852. The controlled parameters may be for instance fuel flow, fuel mixture, engine speed, cylinder volume, and others, the variation of which may improve and control the engine performance. The servo operating control of the engine may be obtained by use of a datum signal either in the form of a digital number or analog signal. The computed parameter may then be compared with the datum to generate an error signal which is nulled.

The datum signal 150 as shown in FIGURE 1 feeds into the analyzer 132 which may then produce a digital or an analog comparison with computed parameters. A digital datum signal may be scheduled by use of switches and digital comparison circuitry well known in the art. An analog datum signal may be compared with the analog equivalents of the computed parameters. Such analog equivalents are provided by converters 814, 850 and 852 and the comparison involves circuitry well known in the art.

Thus, in FIGURE 8 a speed datum signal 855 is shown connected to one input of a comparator 853 whose other input is obtained from the output of digital-to-analog converter 852. The speed error signal produced may be used to control the speed of the engine.

Similarly, a power datum 857 (IHP, SHPL, DHPL) may be compared with the analog computed power from digital-to-analog converter 850 to produce a power error signal and a mean effective pressure (MEP, MESP, or MEDP), datum 817 may be compared with the analog of the computed function to produce a mean pressure error signal for control.

The speed error signal could be used to maintain a specific engine to a desired speed and synchronize other engines to the same speed.

The MEP, MESP, MEDP datum signals may be obtained from a programmed reference command, or the previously computed value or an average value. The use of a previously computed value represents a self-optimizing technique in that an error signal is applied to an actuator until no further increases in MEP, or decreases in MESP, MEDP can be realized.

The use of an average MEP, MESP, or MEDP value can be advantageously applied to a load-sharing technique for each of the cylinders of an engine. For instance, all the computed cylinder MEP's may be averaged whereupon the cylinder MEP values are controlled to agree with the average value so that the cylinders perform equal work. In addition, an average desired MEP value may be used for establishing an operating point.

All the above described techniques for engine control may be equally applied with the computed horsepower or power values. The power control or governing could incorporate constraints to avoid exceeding engine operating limits. The power governing could require adjustment of both the speed and mean effective pressure and might include procedural constraints; for example, MEP is maximized first, then MEDP and MESP are minimized, and thereupon V, the displacement, is adjusted to obtain the desired power value.

To plot $P_c$, $P_d$, $P_s$ as a function of volume V it should be realized that most plotters are not capable of following the rapid signal fluctuations of an engine cycle and the plot must be spead out over many engine cycles. As shown in FIGURE 8 the sample and hold signal 724 is connected to the Y axis of the X–Y plotter and the digital-to-analog converter 814 output VP will go to the X axis. Note that when a plot is desired that the switches 842, 732, 809, 821 and 825 are placed in position 2.

The amplifier 710 input is connected as the MEP computation with cylinder pressure on the positive input and with the negative input grounded. The sample and hold output 724 will still feed the two comparators 714 and 716 as well as the plotter 840, but the analog-to-pulse converter 730 will not function in this plotting function.

The BDC pulses will feed via switch 821, AND gate 844 into the counter 820 which will now count engine revolutions from 0 to 400. The ΔV pulses, each of which will represent 1/200 of the total cylinder volume after modification by the divide-by-5 logic section, will be applied via AND gate 846 to the counter 826. The volume count which will drive the digital-to-analog converter 814 will range from 0–200–0 and will be tabulated and stored by the MEP up-down counter 810.

The first BDC pulse will advance the counter 820 to state 1. The first ΔV pulse will also advance the counter 826 to state 1 and a comparison will be sensed by the 11 exclusive OR gates which are constantly monitoring both of these counters. The comparison pulse T, will perform two operations. The first is to command via switch 732 a sample and hold of the pressure signal existing at that time. This will deflect the Y axis of the plotter to a proportional level where it will be held for one engine revolution until the next sample is taken. The second operation is to advance via switch 809 the counter 810 to state 1 where it will be converted to a proportional voltage by the digital-to-analog converter 814 and used to deflect the X axis of the plotter to the first plot point. The next BDC pulse which will occur one revolution later will bring the revolution counter to state 2. When 2 ΔV pulses have arrived, another comparison will exist and the second plot point will be generated. This will continue until the 200th revolution, at which time a point has been plotted for each ΔV pulse from BDC to TDC. The 200th revolution count will be sensed and used to reverse the counter 810 to the down position. The comparison will continue until the counter 810 has returned to 0, closing the P–V curve and completing one plot cycle—equivalent to 400 engine or compressor revolutions. If the plot switch is not turned OFF at this point, the plot cycle will begin again and a repeat of the previously described cycle will be performed.

In 4 cycle operation, if every cycle were sampled, the plot would jump back and forth between two completely different P–V curves. To prevent this, alternate cycles are sampled by use of the 2/4 signal connected to the inputs of AND gates 844 and 846. Hence, for a continuous P–V curve, only the compression power stroke is monitored. This will require 800 revolutions of the engine and will thus require twice the time to complete the plot. At the completion of this P–V cycle, the sequence will be changed by one so that now the other alternate cycle will be plotted. This cycle, the intake-exhaust cycle will also require 800 revolutions.

It is to be understood that the invention is not limited to the specific embodiment herein illustrated and described but may be used in other ways without departure from its spirit as defined by the following claims.

We claim:

1. A device for measuring the indicated power generated by a piston in a cylinder of an engine comprising:
 a pressure sensor for producing a signal commensurate with the pressure in the cylinder,
 means for sensing the speed of the engine and producing a train of pulses commensurate therewith,
 means producing a volume signal indicative of equal volume increments displaced by the piston,
 means activated by the volume signal and responsive to the pressure signal for generating a digital pressure signal indicative of the cylinder pressure at said equal volume increment,
 means for counting the digital pressure signal and generating a signal indicative of the mean effective pressure,
 means for scheduling a signal indicative of the volume swept out by the piston, and
 means controlled by the scheduled volume signal for selecting a predetermined number of speed pulses proportional to the product of the engine speed and the volume swept out by the piston, and
 means controlled by the selected speed pulses for multipling the mean effective pressure signal with the speed signal and producing a number of pulses proportional to the indicated horsepower of the engine.

2. A device as recited in claim 1 for controlling the indicated power output of said cylinder,
 means generating a reference signal commensurate with a desired indicated power from said cylinder,
 means comparing said reference signal with said output signal and generating an error signal commensurate with the difference therebetween, and
 means applying the error signal to said power adusting means to drive said error signal to a minimum.

3. A device as recited in claim 1 for providing a mean effective pressure control for the piston in the cylinder having an element for varying its mean effective pressure comprising:
 means for generating a reference datum signal indicative of the desired mean effective pressure in said cylinder,
 means comparing said computed mean effective pressure signal and said reference datum signal for producing an error signal indicative of the difference therebetween, and
 means applying said error signal to said cylinder element to vary the mean effective pressure and reduce said error signal to a minimum.

4. A device as recited in claim 1 wherein the schedule signal generating means includes:
 means for scheduling a time interval signal having a preselected time duration proportional to the cylinder volume swept out by the piston, and
 means applying the time interval signal to the multiplying means for enabling the multiplication for the preselected time duration.

5. A device as recited in claim 1 for computing the intake power loss of the engine cylinder and further comprising:
 means for sensing the pressure in the intake to the cylinder and producing a signal indicative thereof,
 wherein said digital pressure signal generating means is also coupled to the intake pressure signal for producing a digital pressure signal indicative of the difference between the intake and the cylinder pressures.

6. A device as cited in claim 1 for computing the discharge power loss of the engine and further comprising:
 means for sensing the discharge pressure of the cylinder and producing a signal indicative thereof,
 wherein said digital pressure signal generating means is also coupled to the discharge pressure signal for producing a digital pressure signal indicative of the difference between the discharge and the cylinder pressures.

7. A device as recited in claim 1 for computing the speed of the engine comprising:
 means for generating a time interval signal having a preselected time duration,
 means enabled by the time interval signal for counting the speed pulses for the duration of the preselected time duration and provide an indication of the speed of the engine.

8. A device for the automatic plotting of the P–V curve of a piston in the cylinder of an engine with a plotter having first and second orthogonal inputs comprising:
 means for sensing the pressure in the cylinder of an engine and producing a signal indicative thereof,
 means for generating volume signals indicative of the volume increments displaced by the piston, said volume increments being distributed in number and spacing commensurate with obtaining an accurate P–V curve of the piston operation in the cylinder,
 means for generating a periodic signal in synchronization with the traverse of the piston in the cylinder,
 first means for accumulating the incremental volume signals between periodic signals,
 second means for accumulating the periodic signals,
 means comparing said first and second accumulating means and producing a sample signal upon a predetermined relationship between said first and second accumulating means,
 means coupling the second accumulating means to one of said orthogonal plotter inputs for deflection thereof, and
 means actuated by said sample signal for coupling the pressure signal to the other of said orthogonal plotter inputs for deflection thereof.

9. A device as recited in claim 8 wherein said second accumulating means further comprises:
 a counter counting the periodic signals during the power stroke of said piston,
 means for reversing the count in said counter for the piston cycle following the power stroke.

10. A device as recited in claim 9 and further comprising:
 means scheduling a cycle signal indicative of the number of engine revolutions required for each power stroke of the piston,
 means applying the scheduled cycle signal to the sample signal producing means for selecting the sample signals of corresponding subsequent engine revolutions.

11. A device as recited in claim 10 wherein said periodic signal is commensurate with either the bottom or top dead center positions of the piston.

12. A device as recited in claim 11 wherein said volume signal producing means produces signals indicative of equal volume increments displaced by the piston in the cylinder.

13. A method for plotting the P–V curve of a piston in a cylinder of an engine with a plotter having two orthogonal inputs comprising:
 sampling the pressure of the cylinder at periodically recurring sampling times corresponding to sequentially adjacent incremental displacement positions of the piston,
 incrementally deflecting the plotter along one of its orthogonal inputs about the sampling time a distance proportional to the displacement between adjacent incremental piston positions,
 deflecting the plotter along the other orthogonal input distance proportional to the sampled pressure.

14. A method as recited in claim 13 wherein the incremental deflecting step further comprises:
 accumulating the number of sampling times during the power stroke of the piston with an electronic counter,
 reducing the accumulated count in the counter with the number of sampling times occurring during the expansion stroke of the piston following the power stroke, deflecting the one orthogonal input in accordance with the accumulated count in the counter.

15. A method as recited in claim 14 wherein the sampling step comprises:

sampling the cylinder pressure at adjacent incremental displacement positions for an integer number of engine revolutions.

References Cited

UNITED STATES PATENTS

| 2,349,560 | 5/1944 | Reijnst | 73—115 |
| 2,595,425 | 5/1952 | Thomson et al. | 73—116 X |
| 2,800,014 | 7/1957 | Welch et al. | 73—116 |
| 3,283,569 | 11/1966 | King et al. | 73—116 |

OTHER REFERENCES

Ohigashi, S., et al.: An Electronic Device for Measuring an Indicated Mean Effective Pressure, published by Society of Automotive Engineers, New York, 1961, pages 1 and 2. (Copy cited by applicants.)

Butusov, I. V.: Automatic Control Measuring and Regulating Devices, Macmillan Co., New York, received Mar. 29, 1965, pages 229–301, TJ 213 B8.

RICHARD C. QUEISSER, Primary Examiner.

J. W. MYRACLE, Assistant Examiner.